US006568841B2

(12) United States Patent
Van Santen et al.

(10) Patent No.: US 6,568,841 B2
(45) Date of Patent: May 27, 2003

(54) ILLUMINATION UNIT FOR A DEVICE HAVING A MULTI-COLOR REFLECTIVE LIQUID CRYSTAL DISPLAY

(75) Inventors: Helmar Van Santen, Eindhoven (NL); Willem Gerard Ophey, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/840,207

(22) Filed: Apr. 23, 2001

(65) Prior Publication Data

US 2001/0046142 A1 Nov. 29, 2001

(30) Foreign Application Priority Data

May 4, 2000 (EP) .............................................. 00201618

(51) Int. Cl.[7] .............................................. G02F 1/1335
(52) U.S. Cl. ........................ 362/561; 362/31; 362/293; 362/331; 359/568
(58) Field of Search ........................ 362/561, 19, 559, 362/293, 231, 31, 330, 331, 583, 558; 359/558, 563, 566, 568

(56) References Cited

U.S. PATENT DOCUMENTS 4,506,949 A * 3/1985 Knop ........................ 348/291
5,748,828 A * 5/1998 Steiner et al. ................ 349/62

FOREIGN PATENT DOCUMENTS

EP 0778484 A2 6/1997 ........... G02B/27/28

* cited by examiner

Primary Examiner—Sandra O'Shea
Assistant Examiner—John Anthony Ward
(74) Attorney, Agent, or Firm—Gregory L. Thorne

(57) ABSTRACT

A reflective liquid crystal display (1) is provided with a front illumination unit. The front illumination unit comprises a flat waveguide (2), at least one surface of which is provided with a diffraction grating (7). A period of the diffraction grating (7) is of the order of the wavelength of the light. A light source (4) generates light of one or more colors, and the colors of light are sequentially coupled into the flat waveguide (2). The diffraction grating (7) is divided into separate areas (10, 11, 12). Each of these separate areas (10, 11, 12) is tuned to one particular wavelength of the light generated by the light source (4). Each separate area (10, 11, 12) is subdivided into various small areas so that the surface of the flat waveguide is subdivided into a large number of small areas (10-1, 11-1, 12-1, ... 10-11, ... 12-41). Each small area (10-1, 11-1, 12-1, ... 10-11, ... 12-41) is bounded by small areas (10-1, 11-1, 12-1, ... 10-11, ... 12-41) tuned to other light wavelengths. A polarizer (6) is present above the waveguide (2) to reflect light polarized in one direction back to the reflective liquid crystal display (1) and to transmit image-wise polarized light in a direction transverse to the one direction.

23 Claims, 1 Drawing Sheet

ILLUMINATION UNIT FOR A DEVICE HAVING A MULTI-COLOR REFLECTIVE LIQUID CRYSTAL DISPLAY

The invention relates to an illumination unit for a device having a reflective liquid crystal display (LCD), comprising a flat waveguide above the LCD with a lower side facing the LCD and an upper side remote from the LCD, and a light source for coupling light into the flat waveguide.

Such an illumination unit is known from European patent application EP-A-0 778 484. The flat waveguide described in this document comprises two parts placed on each other. One part is anisotropic with respect to light and thus exhibits birefringence, whereas the other part is isotropic. The interface between the two parts is grating-shaped, formed by a one-dimensional grating. Color selection takes place by means of colored filters between the flat waveguide and the reflective parts of the reflective liquid crystal display. The refractive index of the isotropic part of the flat waveguide should be preferably equal to one of the two refractive indices of the anisotropic part of the flat waveguide.

It is a drawback of the known device that it is not easy to manufacture and comprises a plurality of elements which must be positioned with respect to one another.

It is an object of the invention to provide an illumination unit for a device having a reflective liquid crystal display, which unit has a simple structure and does not require selection of materials which must have equal refractive indices, be transparent, uncolored and positioned against one another in the form of a grating.

According to the invention, this object is achieved in that the light source is adapted to alternately emit light of a plurality of colors, which plurality may also be one, in that at least one side of the flat waveguide is provided with a diffraction grating, and in that the diffraction grating comprises at least as many areas tuned to different colors of light as the plurality of different colors of light emitted by the light source.

It is thereby achieved that a simple structure is possible for a light source emitting light of one color, without selection of transparent, uncolored materials having equal refractive indices and without the need for positioning parts against one another in the form of a grating. In addition, it is achieved that, for a light source emitting more colors of light, the color selection of the light takes place time-sequentially by means of the diffraction grating, so that only one color of light defined by the light source is each time transmitted through the flat waveguide towards the reflective liquid crystal display. The diffraction grating diffracts the light incident at an acute angle towards the reflective liquid crystal display, provided that this light has the correct wavelength and is incident at the correct angle so as to be able to contribute to the formation of the image. The light which is subsequently reflected by the reflective liquid crystal display towards the flat waveguide no longer encounters a grating on its path, which grating has such properties that reflection takes place on this grating. The light coming from the reflective liquid crystal display thus passes the grating in an unhindered manner.

The preferred embodiment of an illumination unit according to the invention is characterized in that the tuned areas are subdivided into small areas which are distributed on the relevant side of the flat waveguide.

In this way, it is ensured that the illumination of the reflective liquid crystal display is evenly distributed across the surface area of the reflective liquid crystal display so that all reflective elements of the reflective liquid crystal display are illuminated in a sufficiently uniform manner.

A further preferred embodiment of a unit according to the invention is characterized in that the grating period of a small area of the diffraction grating is of the order of the wavelength of the light to which it is tuned.

It is thereby achieved that a sharp selection of the color of the light is possible, which light is reflected by the diffraction grating exactly in the desired direction of the liquid crystal display, particularly the area which is tuned to the relevant color of light. It is true that all other colors of light are also scattered on the area which is tuned to the first-mentioned color, but this takes place in other directions, with the result that, after reflection on a reflective element of the reflective liquid crystal display, the light rays of these different colors have such a direction that they do not contribute to an image which is visible to a viewer. This is particularly important and advantageous in a situation in which the reflective liquid crystal display has small dimensions, of the order of a half to 1 inch, and the image must be viewed with an optical device. In such a situation, only those light rays that reach the relevant optical system are important.

A further preferred embodiment of a unit according to the invention is characterized in that the small areas for the different colors of light are evenly distributed on the relevant side of the flat waveguide.

It is thereby achieved that a uniform illumination of the reflective liquid crystal display is possible with every color of light emitted by the light source.

A further preferred embodiment of a unit according to the invention is characterized in that the total surface areas of the small areas are mutually inversely proportional to the intensities of the different colors of light emitted by the light source.

It is thereby achieved that, if the light source does not emit light of the same intensity for each color, the intensity of the image finally shows a good balance between the different colors of light constituting the image, so that a viewer perceives all colors of light as being emitted with the same intensity by the light source. It is also achieved that the selection of sources for the different colors of light is larger than in a situation in which the intensities of the different colors of light emitted by the light source must be accurately equal to one another.

Yet another preferred embodiment of a unit according to the invention is characterized in that the light from the light source is polarized.

It is thereby achieved that the effectiveness of the diffraction grating increases. Particularly in a situation in which the grating periods of the areas of the diffraction grating are of the order of the wavelength of the light to which the areas are tuned, polarization of the light coupled into the flat waveguide by the light source plays an important role. Polarization of the light emitted by the light source ensures that the ultimate image has a considerably higher contrast ratio than in the case where the light emitted by the light source is not polarized.

A further preferred embodiment of a unit according to the invention is characterized in that a polarizer is arranged proximate to the upper side of the flat waveguide.

It is thereby achieved that light polarized in a direction which does not correspond to the direction of polarization of the light emitted by the light source and thus has a contrast-decreasing effect, is obstructed, so that the contrast of the image is enhanced.

A further preferred embodiment of a unit according to the invention is characterized in that the polarizer is a reflective polarizer.

A reflective polarizer is a material which reflects incident light polarized in a first direction and transmits light polarized in a second direction perpendicular thereto. It is thereby achieved that the efficiency can be enhanced considerably in the case of a correct position of the reflective polarizer as regards the direction in which polarized light is reflected. In this context, the correct direction means that the reflective polarizer reflects light having the same direction of polarization as the polarized light emitted by the light source, and in the other case, polarized light is passed.

These and other aspects of the invention are apparent from and will be elucidated with reference to the embodiments described hereinafter.

In the drawings:

FIG. 1 is a side elevation, not drawn to scale, of an illumination unit according to the invention; and FIG. 2 shows different possibilities in which the small areas may be distributed on the surface area of the flat waveguide.

FIG. 1 shows, in a cross-section, a known reflective liquid crystal display 1, a flat waveguide 2 and, diagrammatically, an optical system 3. A light source 4 and a polarizer 5 are arranged proximate to the flat waveguide 2. A polarizer 6 is arranged above the flat waveguide 2. The flat waveguide 2 is provided with a diffraction grating 7 on the side of the flat waveguide 2 remote from the reflective liquid crystal display 1. The diffraction grating 7 has a grating period which is of the order of the light emitted by the light source 4. The light source 4 emits light of one color or of at least two different colors. If the illumination unit of FIG. 1 is used for displaying images in real colors, the number of colors of light emitted by the light source 4 will be three, namely red, green and blue. When two or more colors of light are used, the diffraction grating 7 is divided into different areas, each area having a grating period which is tuned to one of the colors of the light emitted by the light source 4, while there are (at most) as many areas as there are colors of the light emitted by the light source.

FIG. 2 shows in which way said different areas may be distributed on the surface area of the flat waveguide 2. FIG. 2 shows the upper side of the flat waveguide 2 shown in FIG. 1. Each type of shading represents an area in which the grating period of the diffraction grating 7 is tuned to a specific color of light. In the relevant case, there are three types of shading which correspond to, for example, red light, green light and blue light. The direction of the light coupled into the flat waveguide 2 is indicated by the arrow A. In FIG. 2(a) each area is subdivided into different strip-shaped small areas 10-1, 11-1, 12-1, 10-2, 11-2, 12-2, . . . etc. The strips 10-n are small areas in which the grating period is such that light of a first color is diffracted in a predetermined direction (to be further described with reference to FIG. 1), whereas the strips 11-n diffract another color of light in the same direction and the strips 12-n diffract yet another color of light in the same direction. The minimal dimensions of the small areas 10-n, 11-n and 12-n are substantially larger than the grating period and may be preferably of the same order as the distance between adjacent pixels of the reflective liquid crystal display 1. It has been assumed in FIG. 2a that the longitudinal direction of the small areas 10-n, 11-n and 12-n corresponds to a direction in which pixels of the reflective liquid crystal display 1 are juxtaposed.

If more than one color of light is used, both the intensity of the light emitted by the light source 4 and the efficiency of the diffraction grating 7 may differ for each color. To ensure a satisfactory or desired color balance of the ultimate image observed by a viewer, the total surface areas of the tuned areas may be mutually inversely proportional to the intensity of the colors of light emitted by a light source and may also be mutually inversely proportional to the efficiency of the diffraction gratings 7 for the different colors of light.

Figure 1:
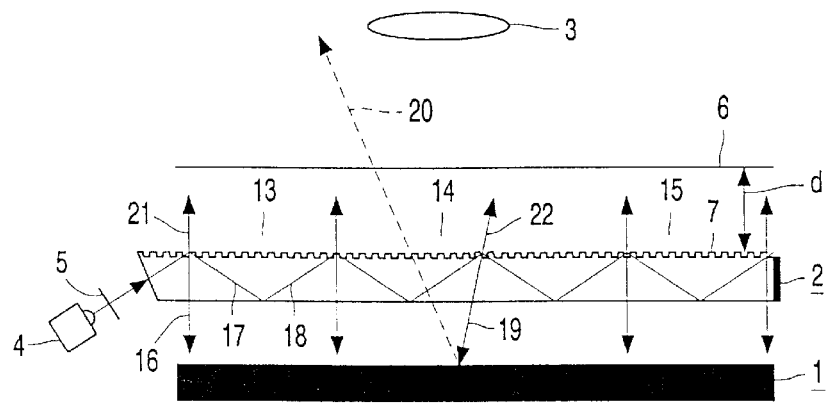

Reverting to FIG. 1, the operation of the unit will be elucidated. In the following elucidation, the description will refer to a specific color of light, i.e. a specific wavelength of the light. Exactly the same applies to the other colors. For the sake of clarity and comprehension, the cross-section of the diffraction grating 7 in FIG. 1 shows three different small areas 13, 14 and 15. The small areas 13 and 15 are associated with the same area, i.e. they have the same grating period, whereas small area 14 is associated with a different area, i.e. the grating period in the small area 14 differs from the grating period in the small areas 13 and 15. In a manner known per se, see, for example, European patent application EP-A-0 778 484 and United States patent U.S. Pat. No. 5,506,929, light from the light source 4 is coupled into the flat waveguide 2 via a polarizer 5. Within the flat waveguide 2, total reflection takes place on its upper side and its lower side. However, due to the presence of the diffraction grating, something else takes place on the upper side. If, as is assumed in FIG. 1, the grating period of the diffraction grating in the small areas 13 and 15 is tuned to the wavelength of the light emitted at that instant by the light source 4, then a part of the incident light is diffracted perpendicularly downwards, as is shown by means of the ray 16 in the direction of the reflective liquid crystal display 1. However, the greater part of the light is reflected on the grating in the form of a reflected ray 17 which is reflected as ray 18 on the lower side of the flat waveguide 2. Said reflection rays 17 and 18 are full reflections. This is achieved by choosing such a material for the flat waveguide 2 and for choosing such an angle for the angle at which the light rays are coupled into the flat waveguide 2 from the light source 4 that the angle between the incident rays on an upper side and the lower side and this upper side and lower side is smaller than the critical angle for the transition between the relevant material of the flat waveguide 2 and air. The ray 16 is reflected back by a pixel of the reflective liquid crystal display 1, either or not to a modified extent of polarization, dependent on whether a quantity of light of the color of the light from the ray 16 is required at that specific position of the image and at that instant. Assuming that light of the color of the ray 16 is indeed required in situ in the image, the ray 16 is reflected in situ by the mirror of the reflective liquid crystal display. The reflection (not shown) takes place in a direction in which the diffraction grating does not have a grating period which will give rise to a diffraction of the reflected ray, and the reflected ray will substantially completely pass through the flat waveguide 2 and the diffraction grating 7 in the direction of a viewer or the optical system 3.

If the grating period of the diffraction grating 7 is not tuned to the color of light which is emitted by the light source 4, either no reflection takes place in a specific direction, except in the reflective direction, or reflection takes place in a direction which is not directed perpendicularly to the surface of the reflective liquid crystal display 1, as is shown by means of the ray 19 in FIG. 1. Ray 19 has the consequence that the grating period in the small area 14 is not tuned in situ to the color of the light emitted by the light source 4 to which the small areas 13 and 15 are tuned. Since ray 19 is incident at an angle on a pixel of the reflective liquid crystal display 1, a possible reflection thereof, indicated by means of the ray 20, will disappear in a direction in which it is either absorbed or is not observed by the viewer or by the optical system 3.

The polarizer 5 is provided because the direction of polarization of the light plays a role in the diffraction of the light when using a diffraction grating 7 with a grating period of the order of the wavelength of the light used. Particularly, a P-polarized wave will be diffracted by the diffraction grating 7 to rays 16 and 19, and an S-polarized wave will be diffracted to a much lesser extent or will not be diffracted. For this reason, the polarizer 5 will be arranged in such a manner that mainly P-polarized waves are coupled into the flat waveguide 2.

Due to the physical properties of the diffraction grating 7, not only a diffraction takes place in the direction of the reflective liquid crystal display 1 but also in the opposite direction, which is indicated in FIG. 1 by means of the rays 21 and 22. Similarly as the rays 17, 18 propagating through the flat waveguide 2, the rays 21 and 22 are P-polarized. These rays reduce the contrast of the image which is generated by means of the unit shown in FIG. 1. The polarizer 6 ensures that the S-polarized waves coming from the pixels of the reflective liquid crystal display can pass in an unhindered manner. However, the P-polarized rays 21 and 22 are absorbed by the polarizer 6.

A particularly advantageous embodiment of a polarizer 6 is a reflective polarizer. In this case, the S-polarized wave coming from the pixels of the liquid crystal display 1 is still passed, but P-polarized waves are not absorbed but reflected. It is thereby achieved that the efficiency of the unit is enhanced because the ray 21 is reflected back by the reflective polarizer 6 towards the reflective liquid crystal display 1 where the direction of polarization will be modified (at least partly) from P-polarized to S-polarized due to reflection on the relevant pixel. The S-polarized part reflected by the relevant pixel is passed by the reflective polarizer 6 and contributes to the formation of the image. This enhances the efficiency of the unit.

A particularly advantageous embodiment of a reflective polarizer 6 is a foil which is known by the name of Double Brightness Enhancement Filter (DBEF) marketed by the firm of 3M.

In the configuration shown in FIG. 1, there is a certain distance d between the upper side of the flat waveguide 2, provided with the diffraction grating 7, and the polarizer 6. This is necessary because the diffractive properties of the grating are lost in the case of contact between the polarizer 6 and the diffraction grating 7. An alternative embodiment may be realized by forming the diffraction grating 7 on the lower side of the flat waveguide 2. In that case, the polarizer 6 may be secured to the upper side of the flat waveguide 2, in which case the refractive index of the polarizer 6 is to be taken into account in the sense that the flat waveguide 2 and the polarizer 6 must have such refractive indices that total internal reflection of the light in the waveguide 2 can still take place on the upper side of the flat waveguide 2.

Figure 2A:
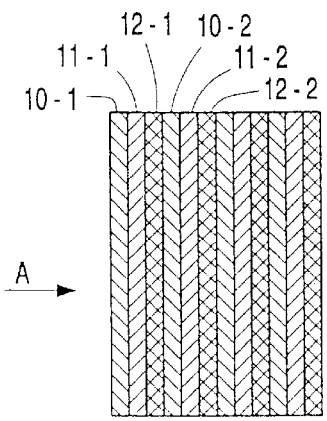
FIG. 2b shows the same strip-wise arranged small areas as in FIG. 2a in which, however, the longitudinal direction of the strip-wise areas extends at an angle $\alpha$ to a direction in which pixels of the reflective liquid crystal display 1 are juxtaposed. In this way, it is simpler to prevent possible Moiré patterns.
FIG. 2c shows a third arrangement in which the small areas for a specific color may be distributed on the surface area of the flat waveguide 2. Here again, small areas shaded in the same way are associated with the same area in which the grating period is equal and is tuned to a specific color of light emitted by the light source 4.
Figure 2B:
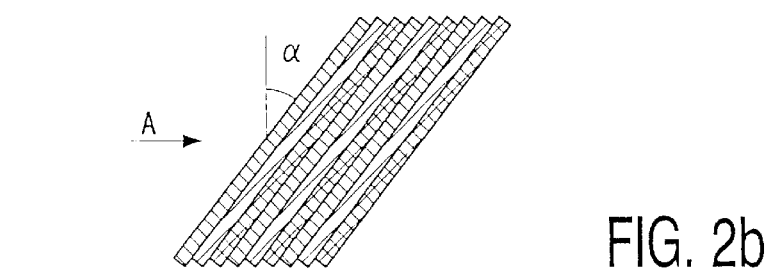
Figure 2C:
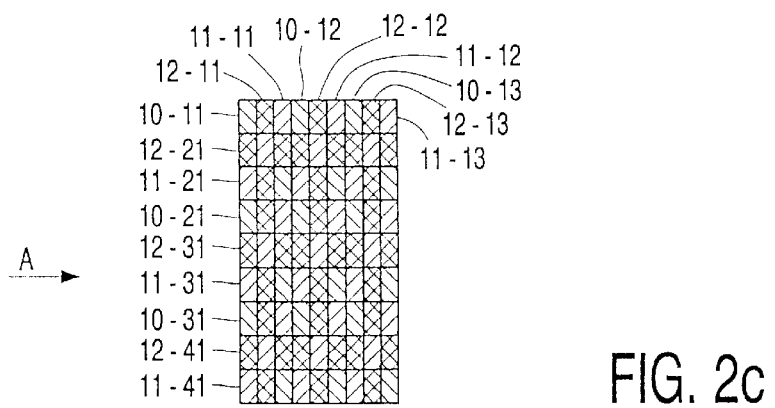

The flat waveguide 2 may be made of a multitude of materials, provided that a diffraction grating 7 of said dimensions can be provided on a surface thereof. A suitable material is, for example, polycarbonate which can be injection-molded in a mold. The mold then comprises the "corrugations" of the diffraction grating 7 which are divided into the required number of areas, with each area being subdivided into small areas in a way as shown by way of example in FIGS. 2a, 2b and 2c. It will be evident to those skilled in the art that area divisions other than those shown in FIGS. 2a, 2b and 2c are possible without passing beyond the scope of the present invention.

Since reflective liquid crystal displays can be made in very small forms, with dimensions of 0.5 to 1 inch being not uncommon, illumination units according to the present invention may be used advantageously in situations in which very small images must be displayed. This may be the case, for example, in portable telephones, pocket televisions, hand-held playback apparatus, etc. Such images having such dimensions can hardly be viewed with the naked eye and an auxiliary device for viewing the image will then be required. To this end, FIG. 1 shows very diagrammatically the optical system 3 of such an auxiliary device. In its simplest form, such a device is a magnifying glass. This provides the possibility of visualizing the small image for the viewer as if it were an image with dimensions ranging from several decimeters to many meters, or distances varying from several decimeters to many meters.

Although S and P polarizations of the light are described in the foregoing, it will be evident that they can be interchanged, i.e. the foregoing entire description of the invention also applies wherever P polarization is read instead of S polarization and wherever S polarization is read instead of P polarization.

Many different embodiments, modifications, etc. can be conceived by those skilled in the art without passing beyond the scope of the present invention as defined in the appendant claims.

What is claimed is:

1. An illumination unit for a device having a reflective liquid crystal display (LCD), comprising a flat waveguide above the LCD with a lower side facing the LCD and an upper side remote from the LCD, and a light source for coupling light into the flat waveguide wherein the light source is adapted to alternately emit light of a plurality of colors, which plurality may also be one, at least one side of the flat waveguide is provided with a diffraction grating, and the diffraction grating comprises at least as many areas tuned to different colors of light as the plurality of different colors of light emitted by the light source.

2. An illumination unit as claimed in claim 1, wherein the tuned areas are subdivided into small areas which are distributed on the relevant side of the flat waveguide.

3. An illumination unit as claimed in claim 1 or 2, wherein a grating period of a small area of the diffraction grating is of the order of the wavelength of the light to which it is tuned.

4. An illumination unit as claimed in claim 1, wherein the small areas for the different colors of light are evenly distributed on the relevant side of the flat waveguide.

5. An illumination unit as claimed in claim 1, wherein the total surfaces of the tuned areas are mutually inversely proportional to the intensities of the different colors of light emitted by the light source.

6. An illumination unit as claimed in claim 5, wherein the light source emits any color of light of the same intensity, and in that the surface area is equally large for each of the different tuned areas.

7. An illumination unit as claimed in claim 1, wherein a total surface areas of the tuned areas are mutually inversely proportional to an efficiencies of the gratings for the different colors of light to which the areas are tuned.

8. An illumination unit as claimed in claim 1, wherein the light from the light source is polarized.

9. An illumination unit as claimed in claim 8, further comprising a first polarizer arranged between the light source and the flat waveguide.

10. An illumination unit as claimed in claim 7, further comprising a second polarizer arranged proximate to the upper side of the flat waveguide.

11. An illumination unit as claimed in claim 10, wherein the diffraction grating is arranged at the upper side of the flat waveguide, and in that the second polarizer is spaced apart from the diffraction grating.

12. An illumination unit as claimed in claim 10, wherein the diffraction grating is arranged on the lower side of the flat waveguide, and in that the second polarizer is arranged on the upper side of the flat waveguide.

13. An illumination unit as claimed in claim 9, wherein the second polarizer is a reflective polarizer.

14. An illumination unit as claimed in claim 13, wherein the reflective polarizer is a foil.

15. An illumination unit for a device having a reflective liquid crystal display (LCD), comprising a flat waveguide above the LCD with a lower side facing the LCD and an upper side remote from the LCD, and a light source for coupling light into the flat waveguide wherein the light source is adapted to alternately emit light of a plurality light of a plurality of colors, at least one side of the flat waveguide is provided with a diffraction grating, and the diffraction grating comprises at least as many areas tuned to different colors of light as the plurality of different colors of light emitted by the light source.

16. An illumination unit as claimed in claim 15, wherein the tuned areas are subdivided into small areas which are distributed on the relevant side of the flat waveguide.

17. An illumination unit as claimed in claim 15, wherein a grating period of a small area of the diffraction grating is of the order of the wavelength of the light to which it is tuned.

18. A reflective liquid crystal display (LCD) comprising an illumination unit having a flat waveguide above the LCD with a lower side facing the LCD and an upper side remote from the LCD, and a light source for coupling light into the flat waveguide wherein the light source is adapted to alternately emit light of a plurality light of a plurality of colors, which plurality may also be one, at least one Bide of the flat waveguide is provided with a diffraction grating, and the diffraction grating comprises at least as many areas tuned to different colors of light as the plurality of different colors of light emitted by the light source.

19. A reflective LCD as claimed in claim 18, wherein the tuned areas are subdivided into small areas which are distributed on the relevant side of the flat waveguide.

20. A reflective LCD as claimed in claim 18, wherein a grating period of a small area of the diffraction grating is of the order of the wavelength of the light to which it is tuned.

21. A liquid crystal display (LCD) comprising an illumination unit having a flat waveguide above the LCD with a lower side facing the LCD and an upper side remote from the LCD, and a light source for coupling light into the flat waveguide wherein the light source is adapted to alternately emit light of a plurality light of a plurality of colors, at least one side of the flat waveguide is provided with a diffraction grating, and the diffraction grating comprises at least as many areas tuned to different colors of light as the plurality of different colors of light emitted by the light source.

22. An LCD as claimed in claim 21, wherein the tuned areas are subdivided into small areas which are distributed on the relevant side of the flat waveguide.

23. An LCD as claimed in claim 21, wherein a grating period of a small area of the diffraction grating is of the order of the wavelength of the light to which it is tuned.

* * * * *